(12) United States Patent
Russell et al.

(10) Patent No.: US 6,588,119 B1
(45) Date of Patent: Jul. 8, 2003

(54) COMPACT GAUGE AND PROCESS FOR ADJUSTING BEARINGS

(75) Inventors: Daniel T. Russell, East Sparta, OH (US); Douglas A. Link, Uhrichsville, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 10/082,913

(22) Filed: Feb. 26, 2002

(51) Int. Cl.⁷ .............................. G01B 3/00; G01B 5/02
(52) U.S. Cl. ....................... 33/517; 33/833; 33/DIG. 13
(58) Field of Search ........................... 33/832, 833, 517, 33/DIG. 13, DIG. 17

(56) References Cited

U.S. PATENT DOCUMENTS

| | | | | |
|---|---|---|---|---|
| 2,627,120 A | * | 2/1953 | Hotchkiss | 33/517 |
| 4,150,468 A | * | 4/1979 | Harbottle | 33/DIG. 17 |
| 4,468,861 A | * | 9/1984 | Overland | 33/517 |
| 4,663,857 A | * | 5/1987 | Mori | 33/517 |
| 5,325,599 A | | 7/1994 | Russell | |
| 5,557,854 A | * | 9/1996 | Fujioka | 33/517 |
| 6,257,078 B1 | * | 7/2001 | Vencill | 33/517 |
| 6,502,307 B2 | * | 1/2003 | Komaba et al. | 33/517 |

FOREIGN PATENT DOCUMENTS

FR             2601776 A1 * 1/1988 ................... 33/517

OTHER PUBLICATIONS

The Timken Company,"Gauging Concepts for Setting Tapered Roller Bearings", 1984.

\* cited by examiner

*Primary Examiner*—Diego Gutierrez
*Assistant Examiner*—Madeline Gonzalez
(74) *Attorney, Agent, or Firm*—Polster, Lieder, Woodruff & Lucchesi, L.C.

(57) ABSTRACT

A gauge for setting a pair of tapered roller bearings that are mounted in opposition has a base to which one of the races for one of the bearings is fitted remote from the location that it normally assumes. In addition, the gauge has male and female elements which slide on the base independently of each other and a spring for urging the elements apart. The spring urges one of the elements against a conical envelope on the detached race and the other element against a conical envelope formed by the tapered rollers around the other race that is in its normal operating position. Sensors measure the strain in the spring, and from the strain one can calculate the distance between like diameters on the conical envelopes. The measurement derived from the gauge together with the desired setting for the bearing enables one to calculate the thickness of a spacer which will provide the desired setting for the bearings.

20 Claims, 4 Drawing Sheets

COMPACT GAUGE AND PROCESS FOR ADJUSTING BEARINGS

CROSS REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

This invention relates in general to adjusting bearings that are mounted in opposition to each other and, more particularly, to a compact gauge utilized to set such bearings and a process embodied in the operation of the gauge.

Rotating shafts see widespread use in a variety of machinery. Typically, a shaft rotates in a housing on a pair of single row antifriction bearings. These bearings may take the form of two single row tapered roller bearings mounted in opposition. In this type of mounting, one bearing is adjusted against the other to control the setting of the bearings, and that setting may range from end play in which some clearance exists in the bearings to preload in which no clearance exists in the bearings and axis has greater rigidity. While preload affords greater rigidity, excessive preload can damage the bearings, and preload can fluctuate with temperature variations. Thus, some bearings are set to end play to avoid the possibility of excessive temperature-induced preload.

In any event, the setting in a pair of opposed tapered roller bearings often depends on a spacer—indeed, the thickness of a spacer behind one of the bearing races or at some other location on the mounting. But taking accurate measurements directly from a mounting that contains the bearing so as to determine the thickness required for a spacer that will provide the bearings with the proper setting, is often difficult, if not impossible because the surfaces from which the measurements need to be taken are often inaccessible or are not stable enough to effect a precise measurement.

A procedure exists for, in effect, projecting a bearing surface out of a bearing mounting, placing the bearing component that normally operates against the bearing surface against the projected surface, and making the measurements for the spacer externally of the mounting with a dial indicator or linear variable displacement tranducer (LVDT). This procedure utilizes a gauge which is somewhat heavy and cumbersome, and certainly tiring to use over extended periods of time, such as on a line where gear boxes or pinion assemblies are assembled. U.S. Pat. No. 5,325,599 discloses such a gauge.

BRIEF SUMMARY OF THE INVENTION

The present invention resides in a gauge that is used to provide a pair of bearings that are mounted in opposition with the correct setting. The gauge has a base and male and female elements that shift axially on the base independently of each other, and the elements in turn have gauging surfaces which bear against separated components of the bearing and are urged apart by a spring. The distance between equal diameters on those components is used to compute the size of a spacer that will give the bearings the proper setting, and that distance is ascertained by measuring the strain in the spring of the gauge. The invention also resides in the gauge fitted against a machine component from which one of the races is separated and also in a process for making the measurement.

BRIEF DESCRIPTION OF THE SEVERAL VIEWS OF THE DRAWINGS

Corresponding reference characters indicate corresponding parts throughout the several views of the drawings.

DETAILED DESCRIPTION OF INVENTION

Figure 1:
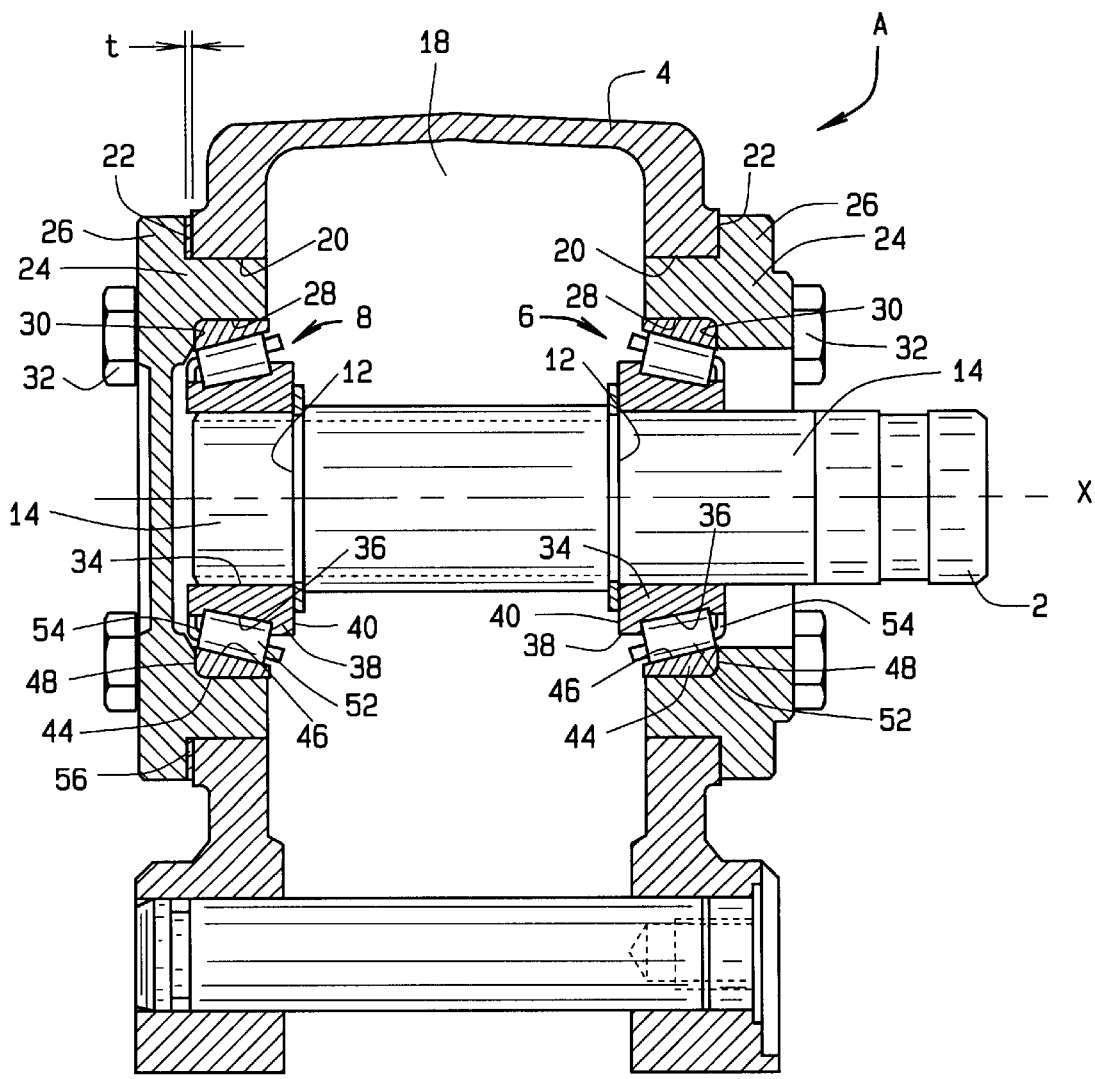
FIG. 1 is a an elevational sectional view of a mounting containing bearings which have been adjusted in accordance with the present invention.

Referring now to the drawings, a mounting A (FIG. 1) includes a shaft 2 which rotates about its axis X in a housing 4 where it is supported in the housing 4 on two single row tapered roller bearings 6 and 8 which are mounted in opposition and adjusted to the desired setting. That setting may be end play in which internal clearances exist in the bearings 6 and 8, or preload, which is characterized by the absence of internal clearances and greater stability for the axis X. The desired setting is obtained with a gauge B (FIG. 2) used during the assembly of the mounting A.

Considering the mounting A in more detail, the shaft 2 has a pair of shoulders 12 and cylindrical bearing seats 14 leading away from the shoulders 12. Between the shoulders 12 the shaft 2 may carry a gear or some other rotating component. The bearings 6 and 8 fit over the bearing seats 14.

The housing 4 encloses a cavity 18 in which the shaft 2 revolves. At its ends the housing 4 has cylindrical bores 20 which open out of end faces 22 that are squared off with respect to the axis X. The bores 20 receive bearing carriers 24. Each carrier 24 has a flange 26 which is presented toward the end face 22 for the housing bore 20 in which the carrier 24 is received and also has its own bore 28 which at one end opens into the housing 4 and at its other end terminates at a shoulder 30. The carriers 24 are attached firmly to the housing 4 by machine screws 32 which pass through their flanges 26 and thread into the housing 4. The carriers 24 support the bearings 6 and 8 in the housing 4 in that the bearings 6 are confined in the bores 28 of the carriers 24.

Each bearing 6 and 8 includes (FIG. 1) an inner race or cone 34 having a tapered raceway 36 that is presented away from the axis X and a thrust rib 38 at the large end of the raceway 36. The thrust rib 38 lies along a back face 40 which is squared off with respect to the axis X. In addition, each bearing 6 and 8 has an outer race or cup 44 provided with a tapered raceway 46 that is presented inwardly toward the axis X and toward the raceway 36 of the cone 34. The raceway 46 at its small end extends out to a back face 48 which is perpendicular to the axis X. Finally, each bearing 6 and 8 has tapered rollers 52 organized in a single row between the raceways 36 and 46 of the cone 34 and cup 44, respectively. The rollers 52 are separated by a cage 54, which further holds the rollers 52 around the cone 30 when the cone 30 is removed from the cup 44. Generally, line contact exists between the side faces of the rollers 52 and the raceways 36 and 46. Moreover, the large ends of the rollers 52 bear against the thrust rib 38 which prevents the rollers 52 from being expelled from the annular space between the cone 34 and cup 44. The rollers 52 are on apex, meaning that the conical envelopes for the side faces of the rollers 52—and for the raceways 36 and 46 as well—have their apexes at a common point along the axis X. This assures pure rolling contact between the rollers 52 and the raceways 36 and 46.

The cone 34 for the bearing 6 fits over one of the bearing seats 14 with an interference fit and with its back face 40 against the shoulder 12 at the end of that seat 14. The cup 14 of the bearing 6 fits into the bore 28 of the surrounding carrier 24 with an interference fit and with its back face 48 against the shoulder 30 at the end of the bore 28. The cone 34 for the bearing 8 fits over the other bearing seat 14, while its cup 44 fits into the other carrier 24, all in a like manner.

The carriers 24 fit into their respective bores 20 in the housing 4 with their flanges 26 presented opposite the end faces 22 on the housing 4. The carriers 24 in effect unite with their respective cups 44 to form race units. The two bearings 6 and 8 are thus located in the housing 4 and around the shaft 2 with their large ends presented toward the interior of the housing 4, that is to say, with the large ends of the rollers 52 for the bearing 6 presented toward the large ends of the rollers 52 for the bearing 8. In other words, the bearings 6 and 8 are mounted in the direct configuration. Typically, the flange 26 of the carrier 24 that is around the bearing 6 bears directly against the end face 22 on the housing 14 and is held tightly against that end face 22 by the machine screws 32. With regard to the other carrier 24 that is around the bearing 8, its flange 26, while being presented toward the other end face 22 on the housing 4, is separated from that end face 22 by a spacer 56 which is clamped tightly between the flange 26 and end face 22 by the machine screws 32 that pass through the flange 26 and thread into the housing 4. Thus the end face 22 and the opposing surface on the flange 26 together with the spacer 56 serve to position the cup 44 of the bearing 8 with respect to the cup 44 of, the bearing 6. Indeed, the spacer 56 establishes the distance between the cups 44 of the two bearings 6 and 8 and thus determines the setting for the bearings 6 and 8. That setting may range from varying amounts of preload to varying amounts of end play, depending on the thickness t of the spacer 56.

Figure 2:
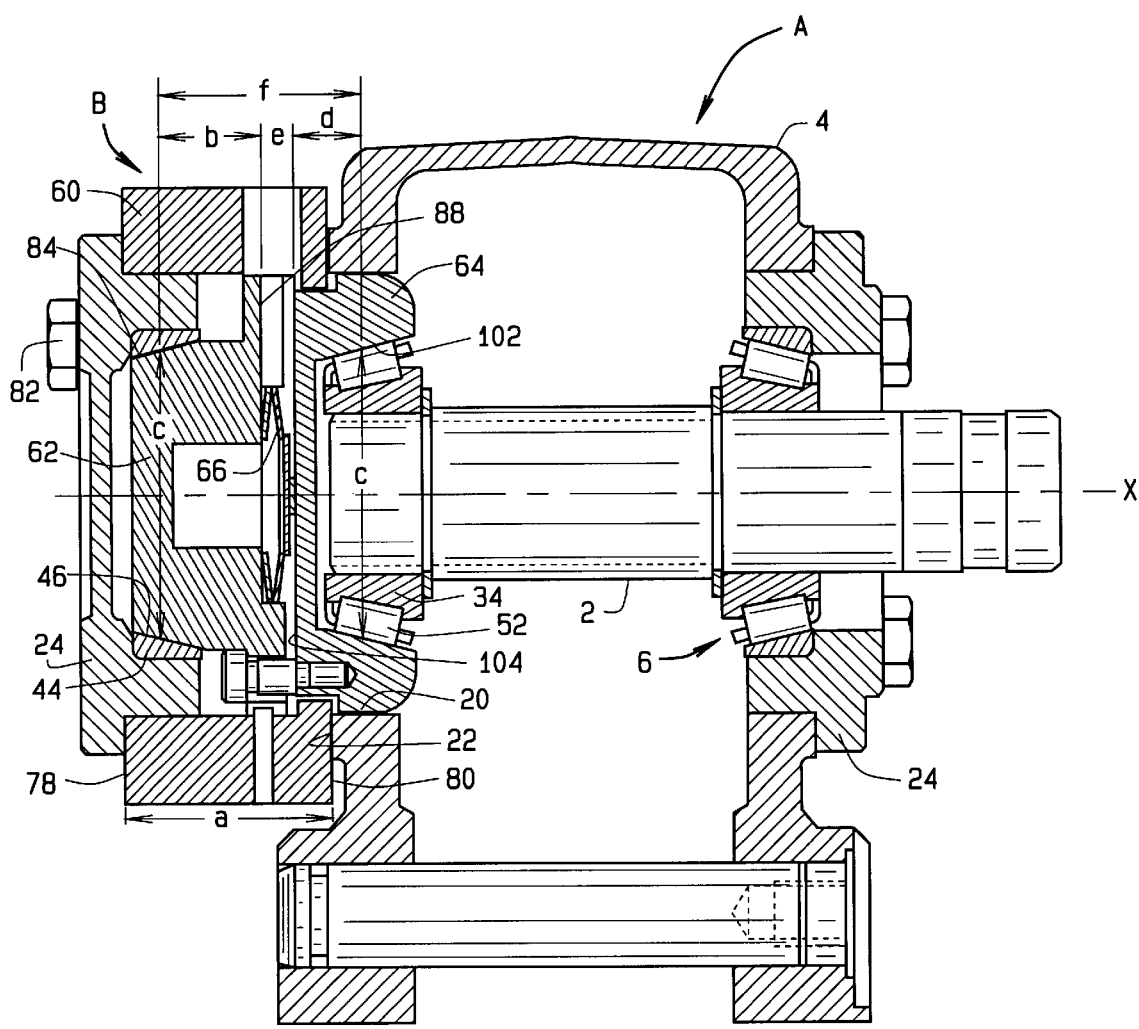
FIG. 2 is an elevational sectional view of the same mounting and a setting gauge installed against it, with the gauge being constructed in accordance with and embodying the present invention.

The setting gauge B enables one to accurately measure the dimension required to provide the bearing with zero end play (no preload, no end play) and from that one can make adjustments to determine the thickness t which will provide the prescribed preload or end play, whatever is desired. It is employed with bearing 6 in place around the shaft 2 and in its carrier 24 and with that carrier 24 secured firmly to the housing 4, but with the cone 34 and cup 44 of the bearing 8 separated from each other (FIG. 2). To be sure, the cone 34 of the bearing 8 is fitted over its bearing seat 14 on the shaft 2 with an interference fit and with its back face 40 against the shoulder 12 at the end of the seat 14. Moreover, the tapered rollers 52 for the bearing 8 encircle the raceway 36 on the cone 34, they being retained by the cage 54. Also, the cup 44 for the bearing 8 is fitted into the bore 20 .of its carrier 24 with an interference fit and with its back face 48 against the shoulder 30 in the carrier 24, uniting the two into a race unit. However, that race unit is detached from the housing 4 and installed on the gauge B. The gauge B, in turn, is installed around the rollers 52 for the bearing 8 and against the nearby end face 22 on the housing 4. In effect, the gauge B projects the conical envelope formed by the outwardly presented surfaces on the rollers 52 axially out of the housing 4. Under the circumstances, the end face 22 becomes a positioning surface as does the opposing face on the flange 26 of the detached carrier 24.

Figure 3:
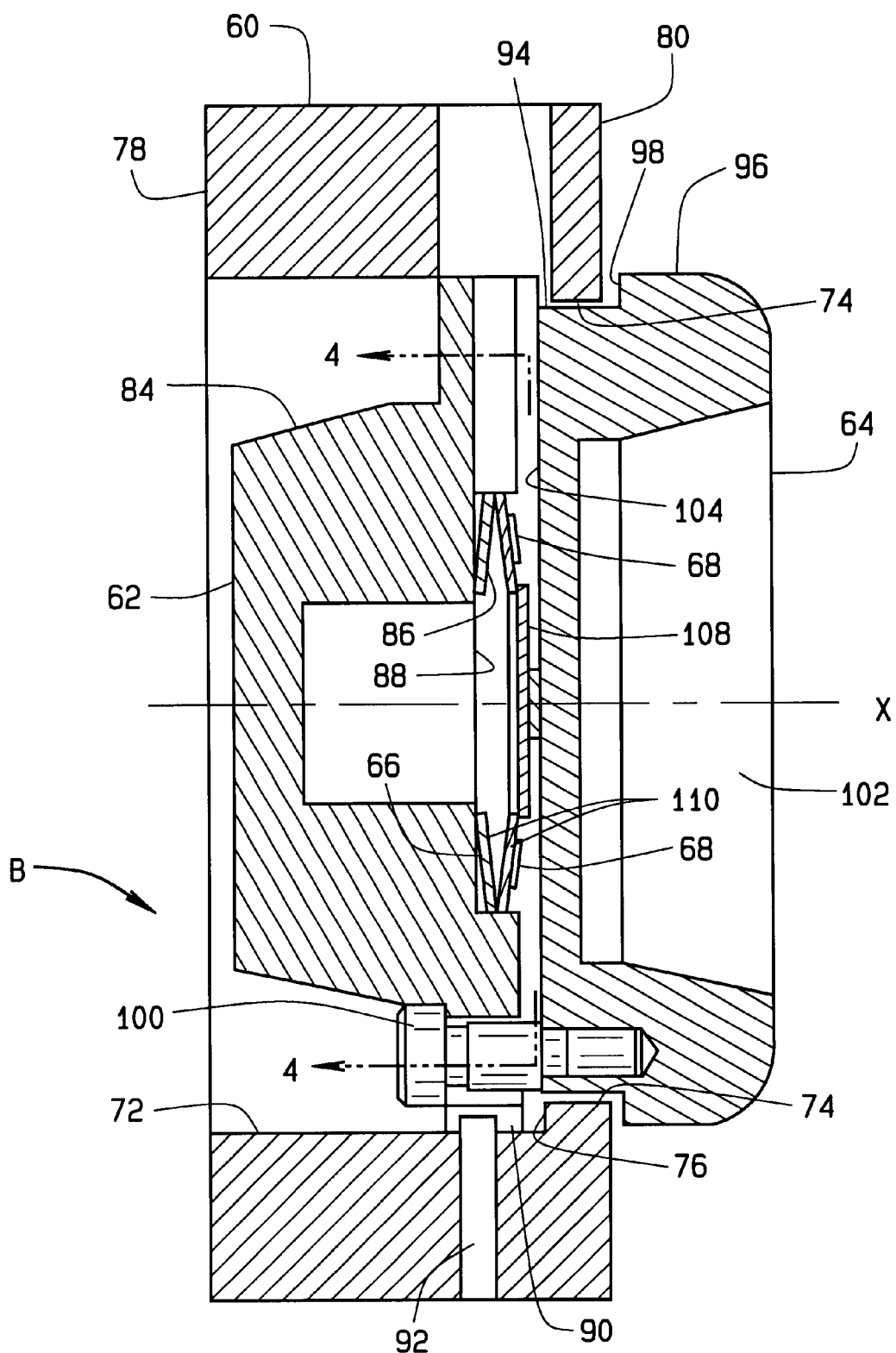
FIG. 3 is a sectional view in elevation of the gauge.

The gauge B includes (FIG. 3) a base 60 and also a male element 62 and a female element 64 that are mounted on the base 60. All three are organized about and along the axis X, with the male element 62 being offset axially from the female element 64, yet both being within the base 60. Indeed, the male element 62 and the female element 64 can slide in the base 60 independently of each other. As a consequence, the male and female elements 62 and 64 may assume varying locations along the base 60 at varying distances from each other. In addition, the gauge B has a spring 66 which urges the male and female elements 62 and 64 apart and sensors 68 for detecting strain in the spring 66.

The base 60 possesses (FIG. 3) a tubular configuration, it having aligned large and small bores 72 and 74 which extend axially and meet at a shoulder 76. The large bore 72 opens out of a rear face 78, whereas the small bore 74 opens out of a front face 80. Both faces 78 and 80 are squared off with respect to the axis X and are spaced apart a distance a (FIG. 2). The diameter of the large bore 72 is about the same as the diameter of the bore 20 in the housing 4, so that the large bore 72 will receive the detached carrier 24 somewhat loosely, just as does the bore 20 in the housing 4. When the detached carrier 24 is in the large bore 72, its flange 26, along the positioning surface on that flange 26, is against the rear face 78 on the base 60. Moreover, the base 60 accommodates longer machine screws 82, and they pass through the carrier 24 and through the base 60 and thread into the housing 4. Thus, the screws 82 temporarily secure the carrier 24 to the base 60 and the base 60 to the housing 4. The front face 80 is of a size that enables it to fit against the end face 22 on the housing 4 with the axis X of the gauge B and the axis X of the bearings 6 and 8 coinciding.

The male element 62 is located (FIG. 3) in the large bore of the base 60 where it is capable of sliding axially a limited distance. It has a external gauging surface 84 which tapers downwardly away from the female element 64 and is small enough to fit into the cup 44 that is within the detached carrier 24 and against the raceway 46 of the cup 44. Indeed, the taper of the surface 84 corresponds to the taper of the raceway 46 in the cup 44, that is to say, both the tapered surface 84 and the tapered raceway 46 lie at the same angle with respect to the axis X and define a common conical envelope having its apex along the axis X. At its opposite end, the male element 62 has a recess 86 and a reference surface 88 which is squared off with respect to the axis X. A fixed distance b (FIG. 2) exists between the measuring surface 86 and an arbitrary diameter c on the tapered gauging surface 84. The male element 62 also contains an axially directed groove 90 into which a roll pin 92 projects from the base 60. The pin 92 prevents the male element 62 from rotating in the base 60, yet does not impede it from sliding axially relative to the base 60.

The female element 64 has (FIG. 3) small and large cylindrical surfaces 94 and 96 which are separated by a shoulder 98. The small surface 94 fits into the small bore 74 of the base 60 with a loose fit, so that it can slide easily in the bore 74, whereas the large surface 96 is of a diameter which enables it to fit loosely into the bore 20 of the housing 4 otherwise occupied by the detached carrier 24. The female element 64 is attached to the male element 60 with shoulder bolts 100 which pass through male element 62 and thread into the female element 64. The arrangement is such that it permits limited axial displacement between the two elements 62 and 64, but not rotation—and since the roll pin 90 prevents the male element 62 from rotating, the female element 64 likewise cannot rotate in the housing 4. The axial displacement, however, is limited by the shoulders 76 and 98 on the base 60 and female element 64, respectively. The female element 64 further has an internal gauging surface 102 which opens out of its forward end and tapers away from the male element 62. The taper of the internal gauging surface 102 corresponds to the taper of the external gauging surface 84 on the male element 62 and also to the conical envelope formed by the outwardly presented surfaces on the tapered rollers 52 of the bearing 8. Finally, the female element 64 has a reference surface 104 which is presented toward the reference surface 88 on the male member 62. At one point along the internal gauging surface 102, the surface 102 has a diameter c (FIG. 2) which equals the diameter c along the external surface 86, and a fixed distance d exists between the diameter c on the internal surface 102 and the reference surface 104. This leaves a variable distance e between the two reference surfaces 88 and 104, owing to the capacity of the two elements 62 and 64 to displace axially with respect to each other. The spacing f (FIG. 2) between the equivalent diameters c on the tapered surfaces 84 and 102 thus resolves into:

$$f=b+d+e$$

Figure 4:
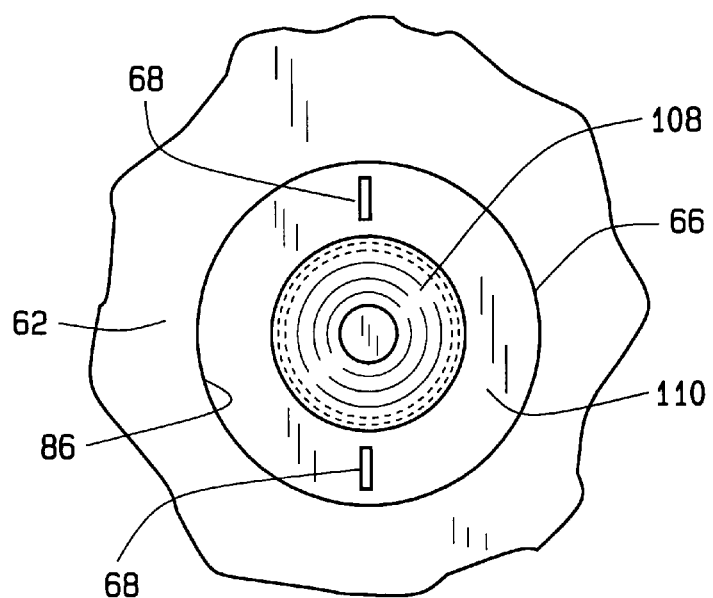
FIG. 4 is a fragmentary sectional view taken along line 4—4 of FIG. 3.

The spring 66 fits (FIG. 3) into the recess 86 of the male element 62 and bears against a small disk or load button 108 on the female element 64, urging the two elements 62 and 64 apart. The spring 66, which is of the Belleville configuration, has two beveled segments 110 which fit together back to back so that their concave surfaces face each other, leaving the convex surfaces to act against the male element 62 and the female element 64. The two segments 110 are stressed slightly when the male and female elements 62 and 64 are spaced farthest apart—that is, when the distance e is the greatest—and tend to flatten as the elements 62 and 64 move together. This imparts greater stress in the segments 110. The increased stress is reflected in a corresponding increase in strain in the radial direction. The sensors 68 measure the change in strain in the radial direction (FIG. 4), and the change produces a signal which is transmitted by electrical leads to an instrument which registers it in terms of the axial compression of the spring 66. Indeed, before the gauge B is placed in operation, the instrument must be calibrated to reflect the actual dimension e between the reference surfaces 88 and 104 on the elements 62 and 64.

To determine the thickness t (FIG. 2) of the spacer 56 required to provide the bearings 6 and 8 with the proper setting s in terms of a lineal dimension, one must first partially assemble the mounting A. This partial assembly includes installing the two cones 34 over their respective seats 14 on the shaft 2 with the back faces 40 of the cones 34 against the shoulders 12 at the ends of the seats 14 and with the tapered rollers 52 held around the cones 34 by the cages 54. Also, the cup 44 for the bearing 6 is installed in its carrier 24 with its back face 48 against the shoulder 30 in the carrier 24. The shaft 2 is then fitted into the housing 4, and the carrier 24 for the bearing 6 is fitted into its bore 20 so that its flange 26 seats against the end face 22 at the end of that bore 20. The carrier 24 for the bearing 6 is secured to the housing 4 with the machine screws 32. When the rollers 52 for the bearing 6 seat against the raceways 36 and 46 on the cone 34 and cup 44, respectively, the cone 34 and rollers 52 for the bearing 8 are located in the other bore 20 which at this juncture is otherwise unoccupied.

Also, the cup 44 for the bearing 8 is fitted into the bore 28 of its carrier 24 with its back face 48 against the shoulder 30 in the carrier 24 to form a race unit, and that unit is installed in the gauge B, that is to say, the carrier 24 is fitted into the larger bore 72 of the base 60 with the positioning surface on its flange 26 secured against the rear face 78 of the base 60. As a consequence, the tapered raceway 46 on the cup 44 encircles the tapered external surface 84 on the male element 62.

Thereupon, the gauge B is fitted to the housing 4. More specifically, the female element 64 of the gauge B, at its large cylindrical surface 96, is fitted into the bore 20 of the housing 4 that is occupied by the cone 34 and rollers 52 for the bearing 8. The gauge B is advanced until the front face 80 on its base 60 bears snugly against the end or positioning face 22 out of which the bore 20 in the housing 4 opens. During the advance the female element 64 fits over the rollers 52 for the bearing 8. The detached carrier 24 and cup 44 for the bearing 8 also move toward the housing 4 and toward the cone 34 for the bearing 8. Indeed, the raceway 46 for the cup 44 seats against the external gauging surface 84 on the male element 62, while the internal gauging surface 102 on the female element 64 comes against the rollers 52 for the cone 34, causing the female element 64 to bottom out on the rollers 52. As a consequence, the male element 62 moves toward the bottomed out female element 64 and the spring 66 between the elements 62 and 64 compresses. The longer machine screws 82 are then fitted through the carrier 24 that is on the gauge B and through the base 60 of the gauge B and threaded into the housing 4. When turned down, the screws 82 clamp the carrier 24, base 60 and housing 4 firmly together.

Next the shaft 2 is rotated slowly in the housing 4, so that the rollers 52 of the bearing 6 seat properly along the raceways 36 and 46 for the cone 34 and cup 44 of the bearing 6. The rotation further causes the rollers 52 for the bearing 8 to seat properly along the raceway 36 for the cone 34 of that bearing 8 and to also seat properly along the internal gauging surface 102 in the female element 64 of the gauge B. The internal gauging surface 102 replicates the raceway 46 of the cup 44 which is in the base 60 of the gauge B.

After the gauge B is fitted against the housing 4 with the longer machine screws 82 and around the rollers 52 of the bearing 8 and the rollers 52 of the two bearings 6 and 8 are properly seated in their operating positions, the strain registered by the sensors 68 is recorded and converted to the dimension e between the reference surfaces 88 and 104 on the male element 62 and the female element 64, respectively. This enables one to calculate the distance f between the equivalent diameters c on the raceway 46 of the cup 44 and the internal gauging surface 102 on the female element 64, that is to say:

$$f=b+d+e$$

From that one can calculate the distance the positioning surface on the flange 6 of the detached carrier 24 will lie beyond the end or positioning face 22 of the housing 4 when it is removed from the base 60 of the gauge B and installed in the housing 4 with the raceway 46 of the cup 44 seated against the rollers 52 for the bearing 8, that distance being the difference between the dimensions a and f. But that does not end the calculations, because the setting s must be included as well. Thus the thickness t for the spacer 56 resolves into $$t=a-f \pm s$$

The setting s is positive when it is end play and negative when it is preload.

Figure 5:
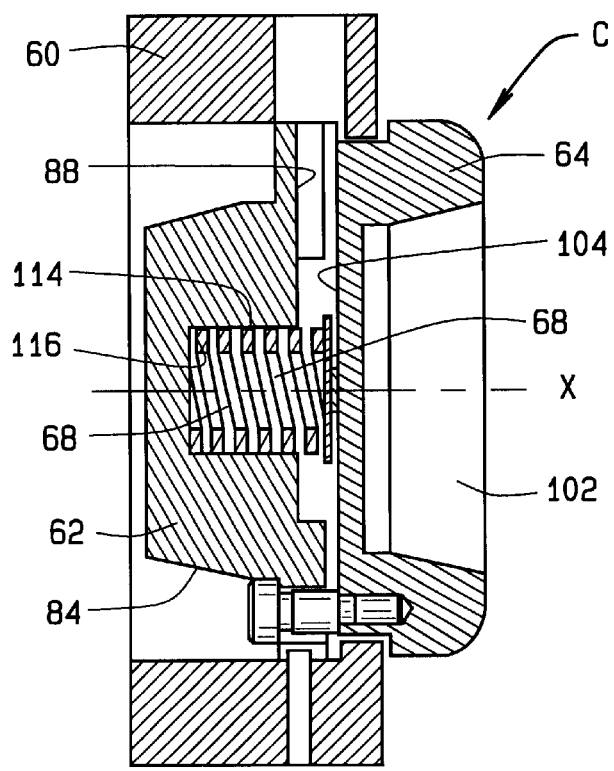
FIG. 5 is a sectional view in elevation of a modified gauge.

In a slightly modified gauge C (FIG. 5), the male element 62 and female element 64 are urged apart by a helical compression spring 114, preferably formed from wire of rectangular cross section. The male element 62 has a deep recess 116 which receives the spring 114. The sensors 68 are located on the convolutions of the spring 114 and are oriented to measure strain in the circumferential direction.

The inner raceways 36 of the bearings 6 and 8 may be located directly on the shaft 2 and the outer raceway 46 for the bearing 6 may be located directly on the carrier 24 or even on the housing 4. But the carrier 24 or race unit for the bearing 8, must be capable of being detached, so that it may be fitted to the base 60 of the gauge B, and thus must be a separate component. The gauge B with slight modifications may be used for bearings or at least the bearing 8 having its cup 44 installed directly in its bore 20 in the housing 4, that is without the intervening cup carrier 24.

Moreover, the concept lends itself to setting the bearing 6 and 8 when mounted in the indirect configuration. In that event, the cup 44 for the bearing 8 is fixed in the housing 4 while the cone 34 and the rollers 52 for the bearing 8 are fitted to the base of the gauge. The male and female elements are reversed and surround the base of the gauge.

What is claimed is:

1. In combination with inner and outer machine components and first and second bearings for accommodating relative rotation between the machine components about an axis, one of the machine components having a positioning surface located at an angle with respect to the axis, the first bearing including inner and outer tapered raceways carried by the inner and outer machine components, respectively, and tapered rollers organized in a row between the raceways, the second bearing including inner and outer tapered raceways and tapered rollers located along the inner raceway, with the outer raceway and the tapered rollers defining identical conical envelopes having their axes coinciding with the axis of rotation, one of the raceways of the second bearing being on a race unit that is capable of being installed on said one machine component and has a positioning surface that is oriented at an angle with respect to the axis and presented toward the positioning surface on said one machine component, the other raceway of the second bearing being carried by the other machine component, the tapered rollers of the first and second bearings being oriented in opposite directions, a setting gauge for determining the thickness of a spacer to be installed between the positioning surfaces, so as to provide the bearings with a desired setting, said setting gauge comprising:

first, second and third gauge elements, two of which are located generally end-to-end to establish a measured axial distance and the other of which extends between the end-to-end elements where it serves as a base and establishes a fixed axial distance,
      one of the gauge elements being against the positioning surface on said one machine component,
      one of the gauge elements being against the positioning surface on the race unit,
      one of the gauge elements having a gauging surface which bears against the conical envelope of the race unit,
      one of the gauge elements having a gauging surface that bears against the conical envelope on said other machine component,
      all such that the size of a spacer, which when fitted between the positioning surface on said one machine component and the positioning surface on the race unit, can be determined by using the difference between the fixed distance and the measured distance;
   a spring urging the end-to-end gauge elements apart; and
   a strain sensor on the spring for determining the change a strain imparted to the spring as the distance between the end-to-end elements varies, whereby the measured distance is determined.

2. The combination according to claim 1 wherein the spring is a Belleville spring.

3. The combination according to claim 2 wherein the sensor is oriented to measure strain in the radial direction.

4. The combination according to claim 1 wherein the spring is a helical spring.

5. The combination according to claim 1 wherein the first gauge element is one of the end-to-end elements and has a gauging surface which bears against the conical envelope of the race unit; wherein the second gauge element is the other of the end-to-end elements and has a gauging surface that bears against the conical envelope that is on said other machine component; and wherein the third gauge element is the other element which extends between the first and second elements and it lies between the positioning surfaces on said one machine component and the race unit to space the positioning surfaces the fixed distance apart.

6. The combination according to claim 5 wherein the gauging surfaces on the first and second elements are tapered surfaces with their tapers corresponding to the taper of the conical envelopes.

7. The combination with inner and outer machine components and first and second bearings for enabling one of the components to rotate relative to the other component about an axis, the outer component having an axially directed bore and a positioning surface located at an angle with respect to the axis, the first bearing including a tapered inner raceway carried by the inner member and a tapered outer raceway carried by the outer component and tapered rollers organized in a row between the inner and outer raceways, the second bearing including an inner raceway carried by the inner member and presented outwardly away from the axis and an outer race unit provided with an outer raceway that is presented inwardly toward the axis, and tapered rollers organized in a row around the raceway of the inner race, the outer race unit being capable of fitting into the bore of the outer machine component and having a positioning surface located at an angle with respect to the axis, the raceways and rollers of the first bearing having their large ends presented toward the large ends of the raceways and rollers for the second bearing so that the bearings are in the direct configuration, a setting gauge for positioning the outer race unit of the second bearing in the bore of the outer component, with the radial positioning between the positioning surface on the outer component and the positioning surface on the outer race unit of the second bearing being such that the directly mounted first and second bearings have a desired setting, said setting gauge comprising:
   a base fitted at its one end against the positioning surface on the outer machine component and at its other end against the positioning surface on the outer race unit;
   a male gauge element located in the base such that it can shift axially on the base and having a tapered external surface that fits into the outer race unit and bears against the tapered raceway of the outer race unit;
   a female gauge element located in the base such that it can shift axially on the base and has one end that fits into the bore in the outer machine component where it is provided with a tapered internal surface that its over and seats against the rollers of the second bearing, with the angle of its taper corresponding to the angle of the taper on the raceway for the outer race unit of the second bearing;

a spring urging the male and female elements apart;

and a stain sensor on the spring for determining the change in strain imparted to the spring as the distance between the first and second elements varies, so that the distance between the tapered surfaces on the first and second elements may be derived from the strain, whereby the spacing between the positioning surface, when the outer race unit is installed in the bore, may be determined.

8. The combination according to claim 7 wherein the spring is a Belleville spring.

9. The combination according to claim 8 wherein the sensor is oriented to measure strain in the radial direction.

10. The combination according to claim 7 wherein the spring is a helical spring.

11. A gauge for setting a pair of tapered roller bearings mounted in opposition to accommodate rotation about an axis, said gauge comprising: first and second gauge elements mounted end-to-end for establishing a measured distance, a third element extending between the first and second elements and establishing a fixed distance; one of the elements having a tapered internal surface, one of the elements having a tapered external surface, the taper of which corresponds to the taper of the internal surface, one of the elements having a front face located at an angle with respect to the axis, one of the elements having a rear face that is located at an angle with respect to the axis and is spaced axially from the front face; a spring positioned to urge the first and second elements apart; and a strain sensor mounted on the spring for determining the change in strain imparted to the spring as the distance between the first and second elements varies.

12. A gauge according to claim 11 wherein the tapered internal surface is on the first element, the tapered external surfaces is on the second element, and the front and rear surfaces are on the third element, with the spacing between them being the fixed distance.

13. A gauge according to claim 11 wherein the spring is a Belleville spring.

14. A gauge according to claim 13 wherein the sensor is oriented to measure strain in the radial direction.

15. A gauge according to claim 11 wherein the spring is a helical spring.

16. A process for setting first and second bearings that accommodate relative rotation between inner and outer machine components about an axis, one of the machine components having a positioning surface located at an angle with respect to the axis, the first bearing including inner and outer tapered raceways carried by the inner and outer machine components, respectively, and tapered rollers organized in a row between the raceways, the second bearing including inner and outer tapered raceways and tapered rollers located along the inner raceway, the outer raceway and the tapered rollers defining identical conical envelopes having their axes coinciding with the axis of rotation, one of the raceways of the second bearing being on a race unit that has a positioning surface oriented at an angle with respect to the axis and spaced axially from the positioning surface on said one machine component the other raceway of the second bearing being carried by the other machine component, the tapered rollers of the first and second bearings being oriented in opposite directions, said process comprising:

placing the inner machine component in the outer machine component seating the rollers of the first bearing along the tapered surfaces for the first bearing with the bearing being between the machine components;

installing a gauge between the positioning surfaces on said one machine component and the race unit of the second bearing and between the conical envelopes of the second bearing so that the conical envelope are spaced axially apart, the gauge including first, second and third elements, two of which are located generally end-to-end to establish a measured distance and the other of which extends between the end-to-end components and establishes a fixed distance, the gauge also including a spring which urges the end-to-end elements apart, measuring the strain in the spring to determine the measured distance;

using the difference between the measured and fixed distances to determine the size of a spacer which, when installed between the positioning surfaces will provide the bearings with the proper setting.

17. The process according to claim 16 wherein the first gauge element is one of the end-to-end elements and bears against one of the conical envelopes; wherein the second gauge element is the other of the end-to-end elements and bears against the other conical envelope; wherein the measured distance is the distance between equivalent diameters on the conical envelopes; and wherein the third gauge element extends between the first and second gauge elements and also between the positioning surfaces to space the positioning surface apart the fixed distance.

18. The process according to claim 16 the spring is a Belleville spring.

19. The process according to claim 18 wherein the strain in the spring is measured in the radial direction.

20. The process according to claim 16 wherein the spring is a helical compression spring.

* * * * *

UNITED STATES PATENT AND TRADEMARK OFFICE
CERTIFICATE OF CORRECTION

PATENT NO. : 6,588,119 B1
DATED : July 8, 2003
INVENTOR(S) : Daniel T. Russell and Douglas A. Link It is certified that error appears in the above-identified patent and that said Letters Patent is hereby corrected as shown below:

Title page,
Item [57], ABSTRACT,
Line 1, after "setting" and before "a" remove "."

Column 3,
Line 36, between "of" and "bearing" remove ","
Line 56, between "20" and "of" remove "."

Column 6,
Line 52, replace "6" with -- 26 --

Column 8,
Line 26, replace "The" with -- In --
Line 48, replace "radial" with -- axial --
Line 63, replace "its" with -- fits --

Column 9,
Line 2, replace "stain" and replace with -- strain --
Line 7, replace "surface" with -- surfaces --
Line 34, replace "surfaces" with -- surface --

Column 10,
Line 20, replace "envelope" with -- envelopes --
Line 27, replace "," with -- ; --

Signed and Sealed this

Sixteenth Day of March, 2004

JON W. DUDAS
*Acting Director of the United States Patent and Trademark Office*